June 5, 1934.     R. PEALE ET AL     1,961,449
PROCESS AND MEANS FOR SIZING PARTITE MATERIAL
Original Filed June 11, 1928     5 Sheets-Sheet 3
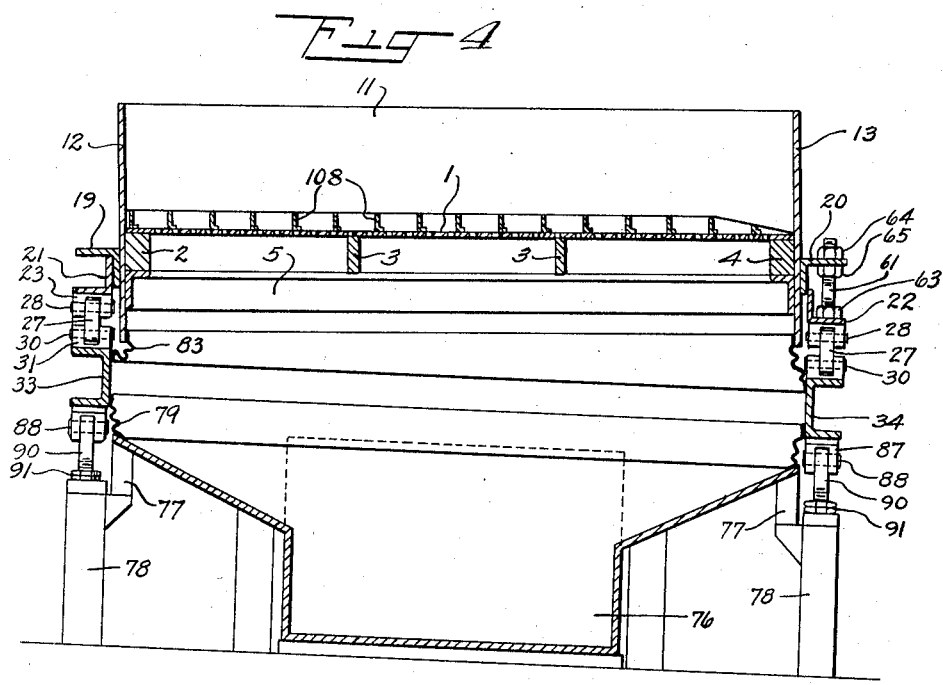

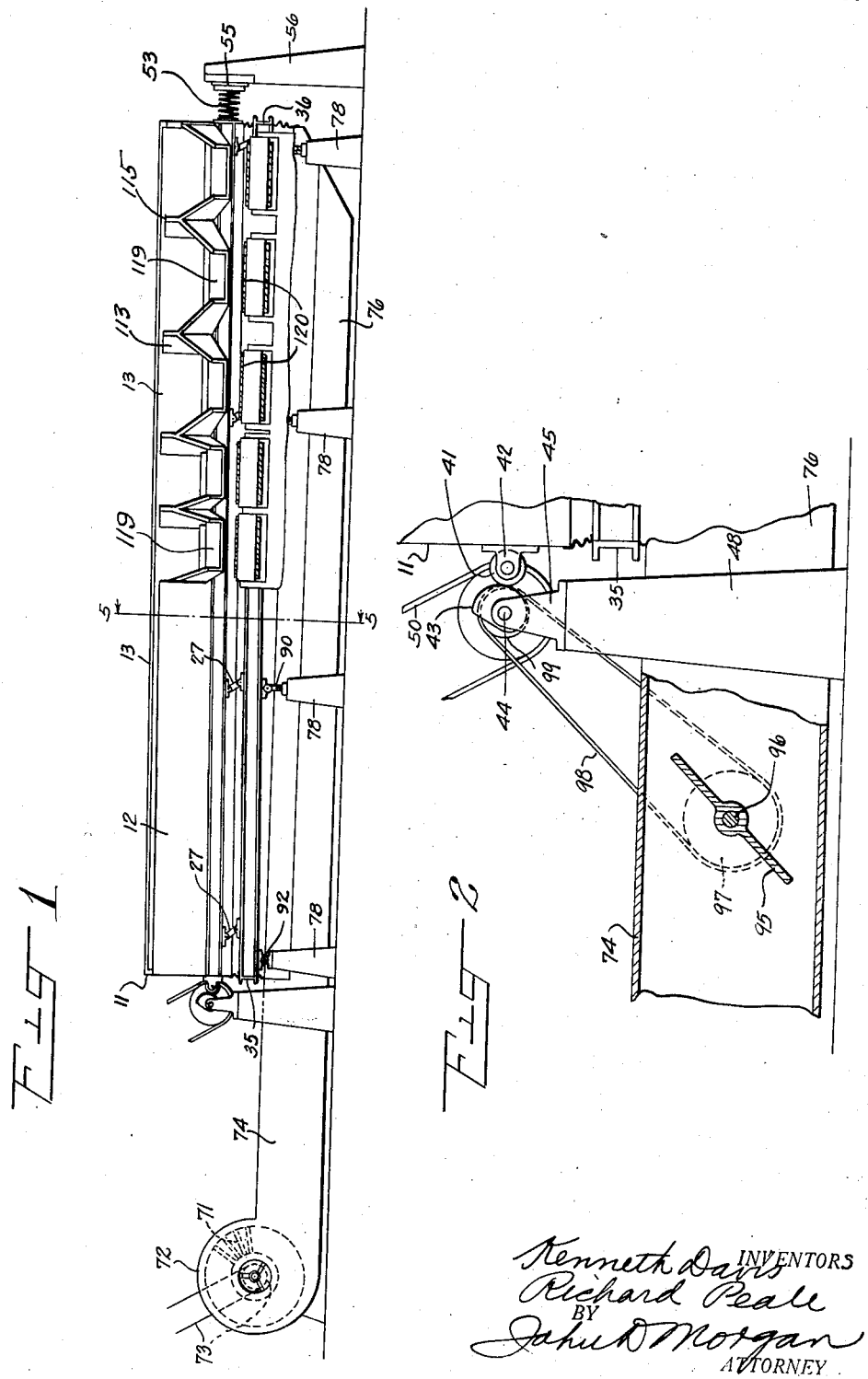

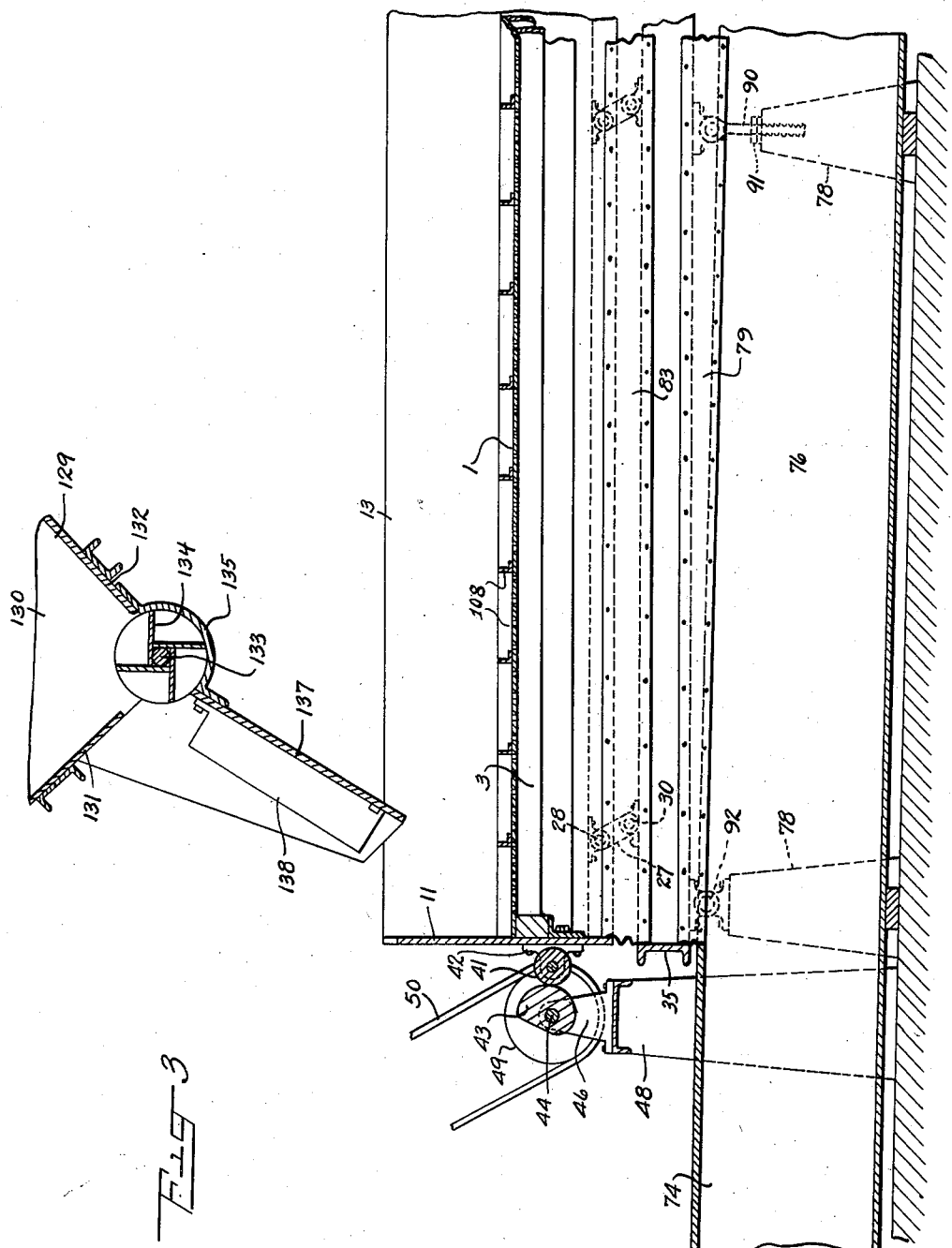

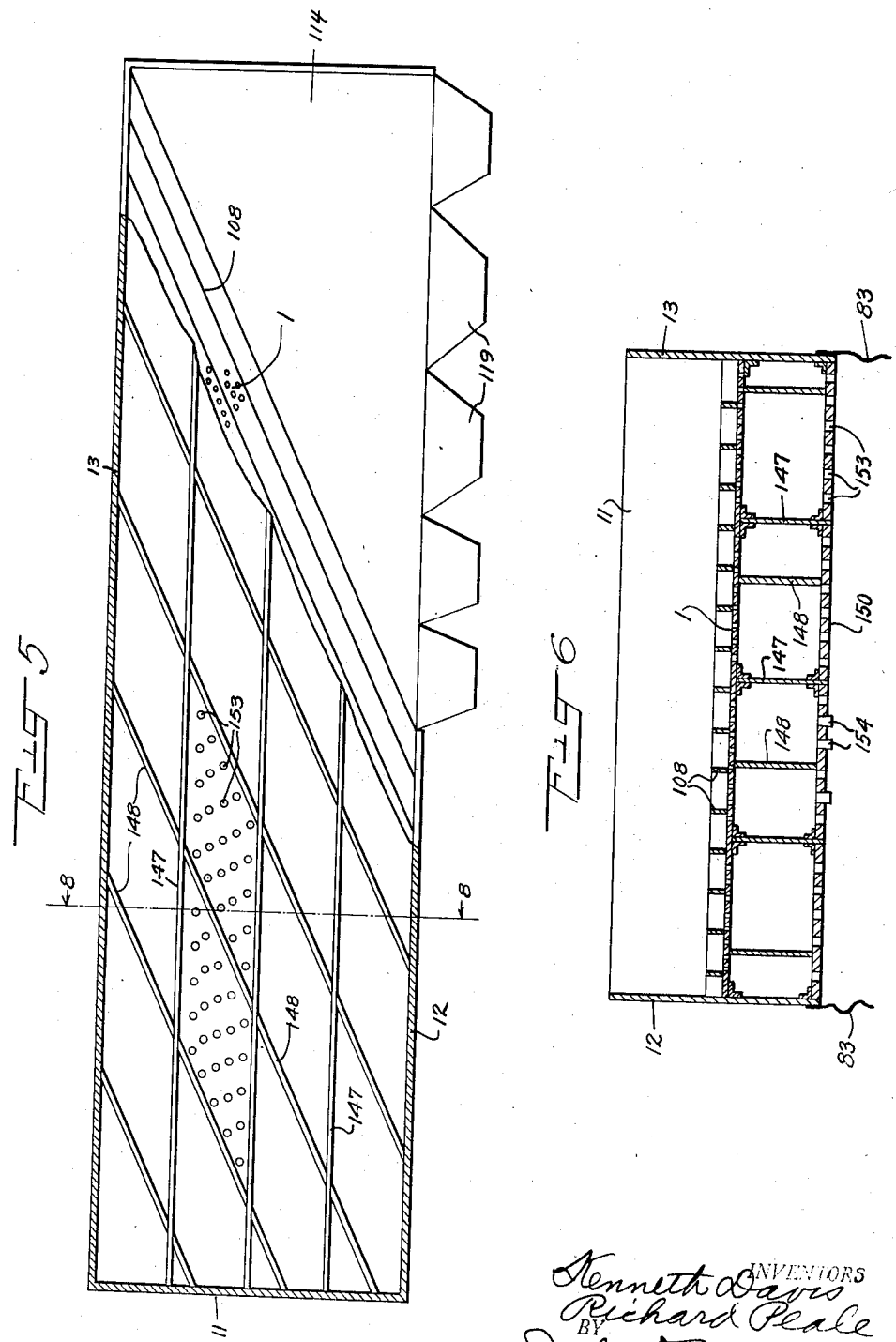

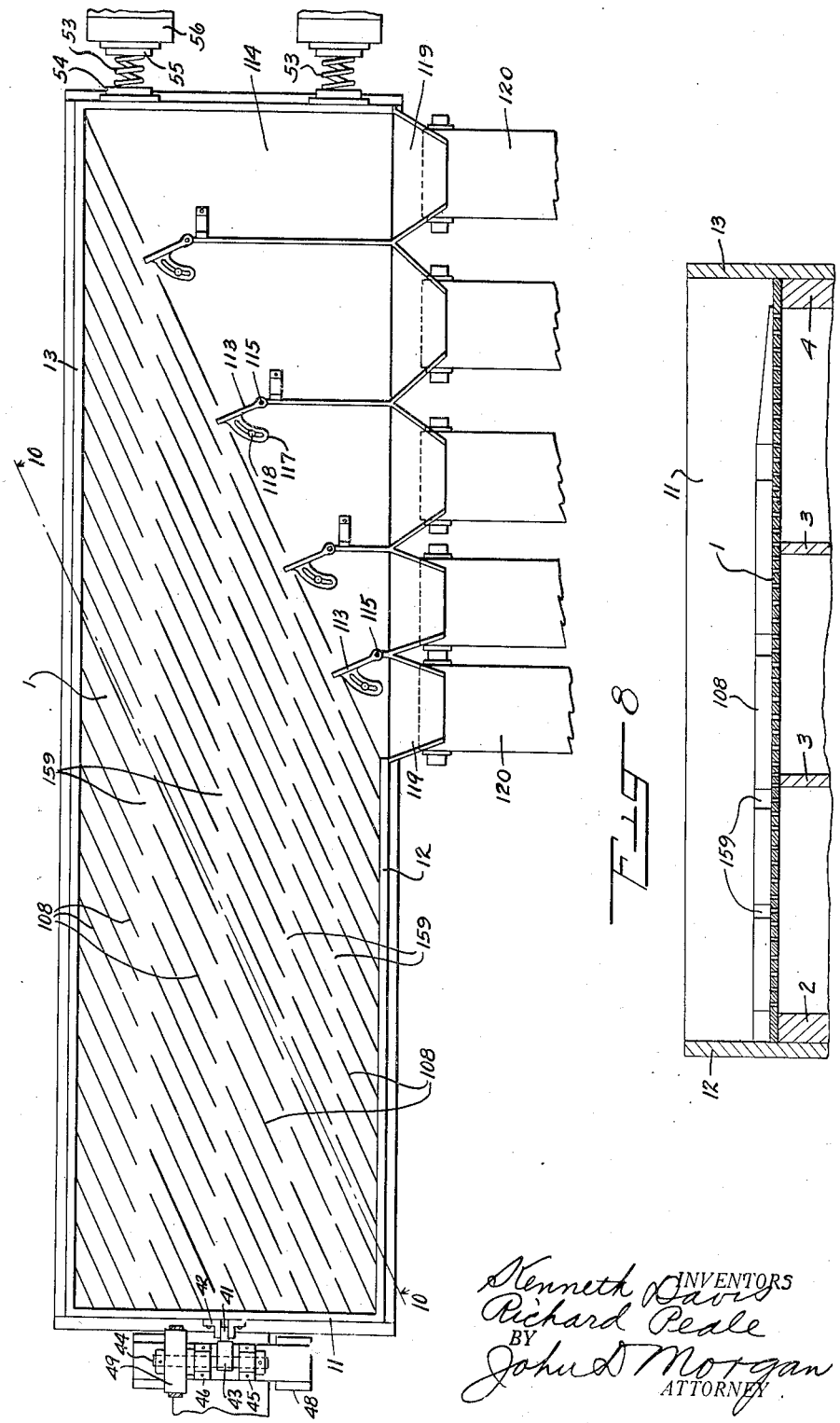

Patented June 5, 1934

1,961,449

UNITED STATES PATENT OFFICE 1,961,449

PROCESS AND MEANS FOR SIZING PARTITE MATERIAL

Richard Peale, St. Benedict, and Kenneth Davis, Ebensburg, Pa., assignors, by mesne assignments, to Peale-Davis Company, Wilmington, Del., a corporation of Delaware Application June 11, 1928, Serial No. 284,602
Renewed April 3, 1931

4 Claims. (Cl. 209—467)

This invention relates to a novel process and apparatus for effecting size classifications of partite or divided materials, and more particularly to a new and useful process and apparatus for separating or classifying partite or divided material into a relatively large number of classified sizes by a single process and mechanism.

Objects and advantages of the invention will be set forth in part hereinafter, and in part will be obvious herefrom, or may be learned by practicing the invention; such objects and advantages being realized and attained by the steps and through the instrumentalities pointed out in the appended claims.

The invention consists in the steps, processes, parts, combinations, improvements, constructions and arrangements herein shown and described.

The accompanying drawings, herein referred to and constituting a part hereof, illustrate one embodiment of the invention and the preferred manner of practicing the same, said drawings together with the description serving to illustrate the principles of the invention.

Of the drawings:

Fig. 1 is an elevation of a mechanism embodying the invention;

Fig. 2 is an enlarged, fragmentary, detail elevation, with parts in section, of the table reciprocating mechanism and the means for creating a pulsating air current;

Fig. 3 is a fragmentary, enlarged, longitudinal central section, on an enlarged scale, of the rear part of the table shown in Fig. 1, and showing the feeding mechanism in section;

Fig. 4 is a transverse, vertical section taken substantially on the line 5—5 of Fig. 1;

Fig. 5 is a top plan of the air chambers beneath the table deck;

Fig. 6 is an enlarged, transverse horizontal section, on line 8—8 of Fig. 5;

Fig. 7 is a top plan of a modified form of table deck;

Fig. 8 is a detail sectional view illustrating in elevation one form of separating partition.

The invention is directed primarily to effecting size classification (which is equivalent to "screening") of partite or divided material into a relatively large number of classified sizes by a single process and a single mechanism. In size classification or "screening" as customarily performed, partite or divided material is run over a screen having apertures of a given size, all pieces or parts of lesser size passing through the apertures, and all pieces or parts of greater size passing over the screen. This obviously affects a classification of the entire mass of materials into two parts, one part comprising all pieces above a fixed size, and the other all pieces below that fixed size. If all the material passing through the before-mentioned screen is passed over another screen, again there is a further classification into two sizes. Therefore, if a classification into six sizes is desired, there are of necessity five successive screening operations, and five different screening mechanisms must be employed.

By the present invention, all these separate and successive classifying operations are obviated and the corresponding number of mechanisms, essential in the present practice, are dispensed with, and the entire mass or quantity of vari-sized partite material, by a single process and with the use of a single apparatus, will be simultaneously classified into any desired number of size classifications within practicable limits. In the present process, furthermore, all screening mechanisms are dispensed with, together with the inherent difficulties and disadvantages of that type of operation, and also the concomitant handling over and over of the material. By the present invention the intermixed mass of widely vari-sized, partite or divided material is delivered to one end of a sizing table, and all the various sizes desired are delivered continuously from the table during its operation.

The process of the present invention comprises feeding the vari-sized mass of partite or divided material to the rear end of an air pervious table or deck in such regulated quantity as to maintain upon the table a forwardly moving bed of material continuously undergoing classification or sizing. The bed of materials is subjected to the lifting and loosening action of an air current or aid currents, forced upwardly through the bed, and beginning at the rear of the table, by reason of this air action and the resultant loosening of the particles or pieces, the larger and heavier pieces settle at once upon the table while the smaller particles are buoyed or floated on the air current.

Immediately on so settling, these larger and heavier pieces are impelled transversely in the bed to begin a size classification of the material transversely of the bed. This transverse positioning and consequent classification according to size is effected by friction and inertia, and by mechanical direction or impulsion of the pieces or particles which have just previously settled upon the table, as described. That is, this preliminary or first size-classification, which has been effected by causing the largest pieces or particles to settle on the table, is immediately subsequently and sequentially transversely positionally classified. The operation or process is repeated on the next largest size on an area immediately forwardly on the table, and so on forwardly, with parts or particles of continuously diminishing sizes settling on the table and immediately and sequentially being subjected to the mechanically-effected transverse positional classification. This process continues along the table so far as settlement in size classification is concerned with consequent and sequential transverse classification as described, until at the forward end of the table the bed consists of a forwardly flowing mass gradated or sized transversely across the table, and is so discharged. The process guards against the incidental temporary settling of finer particles in the lower strata, by permitting continued forward flow of such chance settled particles of lesser size in areas where the larger sizes only are supposed to settle. One of the great advantages of our process over ordinary screening is that we avoid breakage of the material, which is very high with successive screenings. We also avoid delays and defective work, such as results from clogging of screens.

Of course, all these operations are taking place concurrently and gradually along the table and at different points along the forwardly progressing bed, and there is no sharp or arbitrary division in the bed into delimited sizes. But the result is, as just stated, that at the forward part of the bed the material in the bed is classified transversely according to size from largest at one side to smallest at the other. By using variably positionable parting blades or devices at the delivery end, any number of different sizes, within practical limits, may be taken from the table, the space between two adjacent separating blades being equivalent or similar to the difference in the sizes of the apertures of two screens.

The transverse positioned classification according to size which is effected in the forwardly moving bed of materials is effected by longitudinal reciprocation of the table, and by the use of forwardly and transversely inclined separating partitions, behind which the pieces or particles settle, and are then impelled by friction and inertia, and at the same time are directed by the separating partitions forwardly and transversely over the table. Thus the largest pieces, being the first to settle at the rear of the table, and being progressed forwardly and transversely over the table, along the bottom of the bed, to a side edge of the bed, will thence travel forwardly in the bed, and so on progressively across the table, through the sizes of material to the smallest.

The separating partitions are provided with a plurality of gaps to form lanes for the forward travel of the finer particles which may find themselves temporarily in the lower strata, thereby releasing said particles to undergo further size stratification and classification farther along the table.

In practicing the process it is frequently advantageous to maintain the bed at a transverse inclination, the settled sized material being impelled upwardly as well as forwardly and transversely over the table, and along or through the bottom of the bed to the positional size classification described. The bed is also preferably reciprocated relatively slowly upwardly and forwardly and quickly downwardly and backwardly, the path of movement being very short.

It will be understood that the foregoing general description of the invention, and the following detailed description as well, are explanatory and exemplary of the invention, but are not restrictive thereof.

Referring now in detail to the embodiment of the invention illustrated by way of example in the accompanying drawings, an air-pervious deck 1, which may be made of perforated metal plates, is supported upon beams 2, 3 and 4, which beams are carried upon a rectangular table-supporting frame 5 made of inverted channel beams. For the purpose of maintaining upon the table a bed of materials undergoing classification, a rear bed-retaining wall 11 is provided, extending transversely across the rear end of the table, and bed-retaining side walls 12 and 13 are provided along either side of the table; these side walls being preferably extended downwardly below the frame 5, thereby constituting a part of the upper structure of the air chamber beneath the table.

The table 1 is both longitudinally and transversely variably inclinable, and the table is also longitudinally reciprocable through a short path or stroke. As embodied, in a present preferred structure, the table is longitudinally reciprocable by itself, and it is also transversely inclinable by itself and relatively to the air chamber, and the table and the upper part of the air chamber are longitudinally variably inclinable together. This structure provides the longitudinal propulsive effect for the bed of materials, and also provides for variable longitudinal and transverse inclination thereof. Briefly and preliminarily stated, as embodied a table-supporting rectangular frame of inverted angle beams is transversely tiltably supported on a non-transversely tiltable rectangular frame of angle beams. This latter frame is supported for longitudinal reciprocation on a rectangular frame of channel beams. This frame of channel beams is longitudinally variably inclinable on its supports, thereby to impart like longitudinal inclination to the table. This tiltable frame of channel beams has airtight flexible connection with the stationary main body of the stationary air chamber.

In the embodied form of reciprocable mounting means for the table, longitudinally-disposed side members 19 and 20 of the transversely-tiltable table-supporting frame, consisting of inverted angle beams, are fastened to the outer side of the side walls 12 and 13. On one side of the table (which would be the lower side when the table is transversely inclined), the horizontally-extending flange of channel beam 19 rests upon the vertically-extending flange of a channel beam 21, constituting one of the longitudinally-extending side members of a non-transversely tiltable rectangular frame extending about the table. The channel beams 19 and 21 form not only a support for that side of the table, but they also act as a horizontally-disposed hinge about which the table may rock or pivot to vary the transverse inclination thereof. On the opposite side of the table is a channel beam 22, constituting the other side reach of the non-transversely tiltable horizontal frame of which the channel beam 21 is a part.

Fastened to the under-sides of the horizontally extending flanges of the channel beams 21 and 22 are a plurality of spaced-apart, bifurcated blocks 23. A series of upwardly and backwardly-inclined arms 27, at either side of the table, are pivotally connected at their upper ends 28 within the bifurcated blocks 23. These arms 27, at their lower ends, are pivotally supported at 30 in bifurcated blocks 31, which blocks are fixed in like spaced-apart relationship upon the top horizontally-disposed flanges of respective channel beams 33 and 34, extending longitudinally along either side of the structure and constituting, with the cross channel beams 35 and 36, at either end thereof, the frame of the upper part, that is, the reciprocable part of the air chamber.

The reciprocatory movement of the table is preferably upwardly and forwardly and downwardly and backwardly, and this is effected by the backward inclination of the pivotal supporting arms 27. Preferably also the table is given a slow forward motion and a quick backward or return motion. In the embodied form of means for imparting this motion, one or more cam rollers 41 are pivotally mounted in a bracket or brackets 42, fixed to the rear end of the table structure. Cooperating with cam roller 41 is a cam 43, fixed on a transversely-extending shaft 44, which shaft is journaled in pedestals 45 and 46 carried upon a supporting structure 48. The shaft 44 is rotated in any suitable manner, as by a pulley 49 and a belt 50, or other suitable means. Means are provided for holding the table, by cam roller 41, resiliently to the cam 43, and as embodied a plurality of helical compression springs 53 are mounted with one end in blocks 54 on the front end of the table frame, and with the other end in similar blocks 55, fixed in the tops of corresponding supporting pillars 56. There is thereby imparted the described slow, upward and forward stroke and the quick backward and downward stroke to the table. If a uniform reciprocatory movement for the table is preferred or is found more efficacious in certain cases or with certain materials, this may be effected by any known or suitable means.

Referring now to the embodied form of means for effecting or varying the transverse inclination of the table, a plurality of vertically-disposed screw-rods 61 are fixed to, and project upwardly from, the horizontal flange of the angle beam 22, and are fixed in place by suitable means such as nuts 63. These screw rods project loosely through apertures in the horizontal flange of the angle beam 20, and nuts 64 and 65 are screw-threaded on the screw rod 61 on either side of the flange of beam 20. By turning these nuts this side of the table may be raised or lowered to maintain the table horizontally or to tilt it at a greater or less transverse angle, as may be desired.

The embodied form of means for supplying the lifting air currents which are forced through the air-pervious table 1, and through the bed of materials thereon, may be of any desired form so far as concerns many features of the invention. As embodied, however, a rotary fan 71 is mounted in a casing 72, and is driven by any suitable means such as a belt and pulley 73. The fan communicates by a duct 74 with the rear end of the longitudinally tiltable, non-reciprocable air chamber. The air chamber 76 extends along beneath the entire air-pervious deck of the table, and may be of any shape desired. The lower stationary part of the chamber is carried upon supports 77, which in turn are carried upon pillars 78. In this form, only the upper part of the air chamber is tiltable longitudinally, and for this purpose an air-impervious flexible member 79, of canvas or other material, connects the upper edge of the stationary part 76 of the air chamber with the frame 33, which is longitudinally tiltable with the table structure. A like flexible connection 83 connects the frame 33 with the lower part of the side walls 12 and 13, the rear end wall 11 and a corresponding part at the front of a table, to make a flexible connection between this tiltable part of the air chamber and the longitudinally reciprocable table. This connection provides also for the transverse tilting movement of the table.

Referring now to the embodied form of means for longitudinally variably inclining the table and the upper part of the air chamber, a plurality of bifurcated blocks 87 are fixed in spaced-apart relationship on the lower face of the bottom horizontally-extending flange of the longitudinally-extending channel-beams 33 and 34 at either side of the air chamber frame. Pivotally connected at 88 in the bifurcations of the blocks 87 are corresponding screw rods 90, which extend downwardly loosely in recesses formed within the upper part of the supporting pillars 78. Nuts 91 are screw-threaded on the rods 90 and rest upon the tops of the pillars 78. By turning these nuts one way or the other, the forward end of the table may be raised or lowered. The table at its rear end has hinged supports 92 fixed on the top of the rearmost supporting column 78 at either side of the machine.

The intensity or intensities, and the locations or zoning of lifting air currents of different intensities, forced through the table and the bed of materials thereon may be controlled and varied as desired. If zones of different degrees of air-perviosity are desired, these may be provided by using, in different parts of the table, perforate plates in which the respective area of the perforations and of the non-perforated parts vary in the degrees of difference in air-perviosity which may be desired.

In accordance with certain features of the invention, a pulsating air current through the bed is provided, and in the embodied form of means for effecting this pulsating air current, a butterfly valve or rotatable regulating shutter 95 is fixed on a horizontally-disposed shaft 96 within the air duct 74, the shaft being journaled in the side walls of the air duct. In its vertical position the valve 95 practically closes the duct, and in the horizontal position the valve leaves the duct practically wide open. It is usually preferable to operate the pulsation-creating shutter 95 in timed relation with the reciprocation of the table, and preferably the shutter or valve 95 makes a half-revolution for each complete cycle of reciprocation of the table. In many cases it is found efficient to have the shutter 95 in vertical or duct-closing position at the beginning of the table stroke, and as the table goes upwardly and forwardly the valve 95 makes a quarter rotation to full-open position, and as the table comes backward on its quick downward stroke, the valve 95 makes the next quarter rotation again to the closed position. This gives the full lifting effect of the air current at the beginning of and during the backward stroke, and prevents any backward suction through the bed. The regulating shutter 95 may be driven in any suitable manner, as by a belt pulley 97 fixed on the shaft 96, which may be driven by a belt 98 running over a pulley 99 on shaft 44.

The embodied form of means for impelling the settled material diagonally across the table comprises a plurality of separating partitions 108, which are disposed transversely and forwardly at an angle. The rearmost separating partitions connect at their rear end with the rear bed-retaining wall 11, and the more forwardly separating partitions connect at their rear ends with the side bed-retaining wall 12. Thus, after a certain size of parts or particles has settled upon the table, they are impelled forwardly by friction and inertia by means of the longitudinal reciprocation of the table, and are directed or constrained sidewise laterally and forwardly by the separating partitions, and are thus impelled into a transverse positional classification according to size. The size classification by settlement upon the table progresses from one size to another in the bed forwardly along the table, and the consequent and sequential transverse positional size classification of the material has already been described.

As shown in Figs. 7 and 8, the separating partitions 108 are provided with a plurality of gaps 159, which permit the forward escape of fine particles which settle by chance in areas intended for settlement of the larger pieces only. As shown, said gaps are preferably alined so as to permit continued forward travel of such finer settled particles.

The table is preferably provided with an extensive spillage edge 109, for the sized material, and for this purpose the forward edge to the table extends between a short side, say 12, and a long side, say 13, of the table. As the transversely positionally classified or sized material reaches the forward end of the table, means are provided for taking off the classified sizes within desired ranges of size variation. In the embodied form of such means, a plurality of vertically-disposed separating blades 113 are pivotally mounted at 115 upon a discharge plate or shelf 114, extending along the spillage edge 109 of the table. The separating blades 13 are set and held in any desired angular position by suitable means, such as plates 117 having bolt-and-slot connections 118. The sized material as delivered from the spillage edge 109, and separated by the blades 113, is conveyed into corresponding chutes 119, which discharge respectively into conveying belts 120 or other suitable means of discharge.

Suitable means are provided for feeding on the materials to be sized to the rear end of the table, in variable or regulable degree, so as to maintain the bed of the required or desired thickness upon the table, undergoing size classification. The embodied form of such means comprises a hopper 129, having side walls 130 and downwardly and inwardly inclined front and rear walls 131 and 132. In an opening at the bottom of the hopper is a feeding device having a shaft 133 on which is fixed a plurality of tangentially-disposed blades 134, which rotate within a parti-cylindrical casing 135, the shaft 133 being journaled in the end walls of the casing. Shaft 133 is rotated slowly by any suitable form of variable-speed driving means, in order to minutely regulate the discharge of the materials from the hopper 130 onto the table. The feed is preferably entirely across the width of the rear end of the table. The material is delivered onto the table by means of a chute 137, and a plurality of transversely variably positionable directing blades 138 may be mounted in the chute to vary the location and proportional amount of delivery of the materials to the rear end of the bed upon the table, considered transversely thereof.

Means are provided, in accordance with one feature of the invention, for minutely and sub-areally regulating the air pressure action through the bed. In the preferred embodiment thereof (Figs. 5 and 6) in the upper part of the air chamber, and just beneath the air-pervious deck 1 are a plurality of parallelly-arranged, vertically-disposed partition walls 147, and intersecting therewith a plurality of like parallelly-arranged, vertically-disposed partition walls 148. The top edges of both sets of partition walls abut on the under side of the air-pervious deck. Connected to the bottom edges of these partitions is a floor 150, with its edges abutting against and fixed to the lower parts of the back wall 11 and of the side walls 12 and 13 of the table structure. The structure just described constitutes a large number of chambers just beneath the air-pervious table 1. For the purpose of individually regulating the air-current intensity in each of the individual chambers, the floor 150 of each chamber is provided with a large number of apertures 153, into which stoppers or plugs 154 may be fitted. Thus, a most accurate and minute regulation of the intensity of the air currents forced up through all parts of the bed may be effected, irrespective of the other parts of the bed. This sub-areal air current regulating means may be used with or without zoning of the air-pervious table into relatively larger areas of different degrees of air-perviosity, or they may be used with the table having a deck of uniform air-perviosity throughout. Either or both of the features just referred to may be used either with a continuous and substantially constant air current, or with a pulsating air current.

In accordance with the invention, means are provided associated with the separating partitions 108 for assisting in, or increasing the efficiency of, the transverse positional size classification of the material in the bed, and this means may be applied throughout the entire extent of the table or through only certain areas thereof. As embodied, (Figs. 7 and 8) the separating partitions 108 are provided at various points in their length with gaps or passes 159 formed therein. These gaps 159 are preferably gradated in size, along the separating partitions, and especially where the table is inclined transversely, the successive gaps 159 increasing in size forwardly and upwardly along the separating partition 108. The various size gaps 159 may be arranged singly or in groups of two or more gaps of a given size at different points along the separating partition.

The material in the lower part of the bed, that is, that part of the material which is in contact with or closely above the deck, in the various parts of the bed (and it will be recalled that this part of the bed is necessarily continually changing as the classification proceeds) moves transversely of the table, under the forces of friction and inertia and the directive action of the separating partitions. Any pieces of material in this lower part of the bed which may be moving along behind a given separating partition, and which are smaller than a gap 159 which is encountered in the separating partition, will immediately pass through the gap and move directly forwardly along the table, while all pieces of larger size than a particular gap 159 in the separating partition, will be compelled to pass the gap and move still under the directive action of the separating partition. With a series of gaps formed in the successive separating partitions, and thus arranged in succession longitudinally of the table, as illustrated in the exemplary showing of Fig. 7, there will be a continuous and uninterrupted forward flow of pieces of a given size, without further action tending to impel them farther across the table.

This condition and manner of operation will, of course, occur at every gap, or group of gaps 159, of various sizes along the entire length of the separating partitions, and constituting a series of gaps of the same size, arranged along the table. As a result, particles of the smaller size will be permitted to flow freely forwardly without further directive impulsion by the separating partitions from a given point transversely of the table, and so on with all particles of increasingly larger size at successive farther points transversely of the table.

The variably positionable dividing vanes or blades 113 for effecting the various size classifications at the delivery end of the table may be positioned in any desired relation with respect to the gaps 159 in the separating partitions, the gaps of a given size being preferably arranged in series longitudinally of the table, and in the same positional relation considered transversely of the table (as shown in Fig. 7) and a separating blade 113 being located at the forward end of the series of gaps.

In classifying the material according to size, the material operated upon may be of homogeneous or heterogeneous physical properties but in so far as concerns the sizing process, but in the case of such heterogeneous materials, having ingredients or components of different specific gravities, a separation of the materials will be effected concurrently with the classification thereof into sizes. However, as the separating process is effected by the stratification of the various materials into substantially vertically-superposed, horizontally-disposed strata, and the size classification is a transverse positional classification, both of these may be effected without interfering with the other. If a size classification only is desired, this can be secured irrespective of any stratification due to differences in specific gravities.

A size classification of heterogeneous materials having ingredients or components of different specific gravities, taking place concurrently with and as a part of the specific gravity stratification and separation, has been disclosed and claimed in Patent No. 1,786,740 of Kenneth Davis, granted December 30, 1930, and in our copending application Ser. No. 283,600, filed June 8, 1928. The claims in the present application are directed to a sizing action upon homogeneous materials.

Considering solely the sizing process, a bed of substantial thickness may be regarded as resting upon the table, and as progressing slowly forwardly under the reciprocatory action of the table combined with the feeding-on of the unsized material and the delivery from the other end of the bed of the sized material. Considering a theoretical area at the rear of the bed, under the lifting action of the air currents the largest and heaviest pieces only will settle upon the table at the rear part of the bed, and will be impelled forwardly and transversely by friction and inertia and the directive action of the separating partitions, and will occupy the upper side portion of the bed as already described. Considering a theoretical area somewhat more forwardly in the bed, the largest and heaviest of the remaining pieces will settle, and will be thereafter impelled by friction and inertia and directed by the separating partitons transversely and forwardly to a position within the first theoretical size already considered. This action will be repeated in any theoretical area considered forwardly along the table, and will obviously result in a transverse positional classification according to size, with the largest size along the upper side of the table, and the smallest size along the lower side of the table.

The action of the gaps of gradated sizes in the separating partitions in permitting the forward flow of pieces of corresponding and lesser size, and releasing them from the action of the separating partitions at a given point in the width of the table, will also conduce to quick and accurate size classification. It will be obvious, as stated, that any stratification according to specific gravities which occurs perpendicularly of the bed, could take place concurrently with the foregoing process. It will be understood that the different sizes referred to in the foregoing description are not arbitrary dimensional divisions, but are assumed for the purposes of explanation as the process occurs throughout the bed, irrespective of arbitrary sizings or sub-division. It will be further understood that the foregoing statements of theory are our present best understanding from observation of the process and actual successful operation, but we do not wish to be bound thereby as to the exact nature of the different occurrences and stages of the process. However, in practice, the material is delivered in accurate size classification at the delivery end of the bed, and the size division may be determined by the position of the mechanical separating appliances diverting the discharged material into the several channels.

From the foregoing, it will be understood that a process and mechanism for practicing the same has been provided realizing the objects and advantages set forth, together with other objects and advantages; and that departures may be made from the precise manner of carrying out the process, and from the details of structure of the mechanism, without departing from the principles of the invention and without sacrificing its chief advantages.

What we claim is:—

1. The process of sizing divided materials which comprises maintaining a forwardly moving and substantially deep bed of unsized material on a vibrating air-pervious support, effecting vertical positional classification of the particles substantially according to size by passing lifting air currents through substantially all parts of the bed to float the finer particles and to permit substantially only the largest particles to settle to the support, moving said large settled particles transversely beneath the flotant particles, permitting continued forward flow of chance settled particles of lesser size, thereafter permitting lesser sized particles to settle and moving them transversely to a lesser degree, and continuing the operation to effect an approximate transverse classification of the particles.

2. A mechanism for sizing material including in combination an air pervious table, means for regulably feeding unsized material to the rear part of the table to maintain thereon a bed of materials of desired thickness, means for longitudinally reciprocating the table, means for vertically sizing the particles comprising devices for forcing air currents upwardly through all parts of the bed, said air currents being of strength sufficient to float all but the largest particles of the bed, means for retarding and laterally displacing the settled largest particles while permitting the smaller flotant particles to flow freely longitudinally of the table, means for permitting continued forward flow of chance settled particles of lesser size, means for subsequently retarding and laterally displacing intermediate and subsequently settled particles to a lesser degree, and means for discharging all the particles forwardly as a transversely sized stream.

3. A mechanism for sizing material including in combination an air-pervious table, means for reciprocating the table, means for passing air currents upwardly through the table, means for maintaining a bed of unsized materials on the table, a plurality of transversely disposed separating partitions for guiding settled particles along the surface of the table, said partitions having spaced-apart gaps of varying sizes whereby settled particles of material may be guided transversely or freed to flow forwardly in accordance with their relative sizes, the gaps in succeeding partitions being in substantial alinement so as to permit relatively continuous forward flow of said particles.

4. A mechanism for sizing material including in combination an air-pervious table, means for reciprocating the table, means for passing air currents upwardly through the table, means for maintaining a bed of unsized materials on the table, a plurality of transversely disposed separating partitions for guiding settled particles along the surface of the table, means for controlling the air currents to cause the particles to settle in a predetermined size sequence, the partitions having gaps of varying sizes arranged to release settled particles finer than those supposed to settle at a given locus of the table, the gaps in succeeding partitions being in substantial alinement so as to permit relatively continuous forward flow of said particles.

KENNETH DAVIS.
RICHARD PEALE.